(12) United States Patent
D'Hondt

(10) Patent No.: US 12,502,880 B2
(45) Date of Patent: Dec. 23, 2025

(54) METHOD FOR MANUFACTURING A LAMINATE, AN AMINOPLAST RESIN CATALYST USED THEREIN, AND A LAMINATE OBTAINED THEREBY

(71) Applicant: FLOORING INDUSTRIES LIMITED, SARL, Bertrange (LU)

(72) Inventor: Dieter D'Hondt, Sint-Andries (BE)

(73) Assignee: UNILIN, BV, Wielsbeke (BE)

( * ) Notice: Subject to any disclaimer, the term of this patent is extended or adjusted under 35 U.S.C. 154(b) by 275 days.

(21) Appl. No.: 18/256,104

(22) PCT Filed: Dec. 2, 2021

(86) PCT No.: PCT/IB2021/061220
§ 371 (c)(1),
(2) Date: Jun. 6, 2023

(87) PCT Pub. No.: WO2022/123401
PCT Pub. Date: Jun. 16, 2022

(65) Prior Publication Data
US 2024/0075729 A1     Mar. 7, 2024

(30) Foreign Application Priority Data
Dec. 11, 2020   (EP) .................................. 20213558

(51) Int. Cl.
*B27N 3/00*     (2006.01)
*B27N 3/04*     (2006.01)
(Continued)

(52) U.S. Cl.
CPC .............. *B32B 37/18* (2013.01); *B27N 3/002* (2013.01); *B27N 3/04* (2013.01); *B32B 3/06* (2013.01);
(Continued)

(58) Field of Classification Search
CPC ............................... B29C 59/02; B27N 3/002
See application file for complete search history.

(56) References Cited

U.S. PATENT DOCUMENTS 3,888,728 A    6/1975  Petrik et al.
6,335,386 B1 * 1/2002  Kiparissides .......... B27N 3/002
                                                  523/210
(Continued)

FOREIGN PATENT DOCUMENTS

BE    1019453 A3    7/2012
DE    2107091 A1    9/1972
(Continued)

OTHER PUBLICATIONS

International Search Report from corresponding PCT Application No. PCT/IB2021/061220, Apr. 19, 2022.

*Primary Examiner* — Andrew D Graham
(74) *Attorney, Agent, or Firm* — Workman Nydegger

(57) ABSTRACT

A method for manufacturing a laminate includes a carrier material and a cured thermosetting resin. The resin is cured using a catalyst showing one or a combination of two or more of the following properties: the catalyst has a pressure activatable catalyst; the catalyst has an encapsulated catalyst; the catalyst has an organic carboxylic acid. A method is provided for impregnating a paper layer, and an aminoplast resin catalyst is used in the method.

14 Claims, 4 Drawing Sheets

(51) Int. Cl.
  *B32B 3/06* (2006.01)
  *B32B 3/30* (2006.01)
  *B32B 21/02* (2006.01)
  *B32B 21/06* (2006.01)
  *B32B 29/00* (2006.01)
  *B32B 37/18* (2006.01)
  *B32B 38/06* (2006.01)
  *E04F 15/10* (2006.01)
  *E04F 15/02* (2006.01)

(52) U.S. Cl.
  CPC ............... *B32B 3/30* (2013.01); *B32B 21/02* (2013.01); *B32B 21/06* (2013.01); *B32B 29/005* (2013.01); *B32B 38/06* (2013.01); *E04F 15/107* (2013.01); *B32B 2260/028* (2013.01); *B32B 2260/046* (2013.01); *B32B 2305/076* (2013.01); *B32B 2317/125* (2013.01); *B32B 2317/16* (2013.01); *B32B 2419/04* (2013.01); *E04F 15/02038* (2013.01); *E04F 2201/0146* (2013.01); *E04F 2201/0153* (2013.01); *E04F 2201/023* (2013.01); *E04F 2201/043* (2013.01); *E04F 2201/044* (2013.01)

(56) References Cited

U.S. PATENT DOCUMENTS

| | | | |
|---|---|---|---|
| 2009/0264036 A1* | 10/2009 | Yano | H05K 1/0366 162/1 |
| 2011/0052880 A1* | 3/2011 | Iizuka | B44C 5/0469 264/132 |
| 2013/0014891 A1 | 1/2013 | Vandevoorde et al. | |
| 2015/0284566 A1* | 10/2015 | Sniady | B27N 1/0209 106/164.3 |
| 2018/0274246 A1* | 9/2018 | Vandevoorde | B32B 29/00 |

FOREIGN PATENT DOCUMENTS

| | | |
|---|---|---|
| EP | 1225278 A2 | 7/2002 |
| WO | 9747834 A1 | 12/1997 |
| WO | 0196688 A1 | 12/2001 |
| WO | 0196689 A1 | 12/2001 |
| WO | 2006063803 A2 | 6/2006 |
| WO | 2006066776 A2 | 6/2006 |
| WO | 2007054812 A2 | 5/2007 |
| WO | 2013050910 A2 | 4/2013 |
| WO | 2017072657 A1 | 5/2017 |

\* cited by examiner

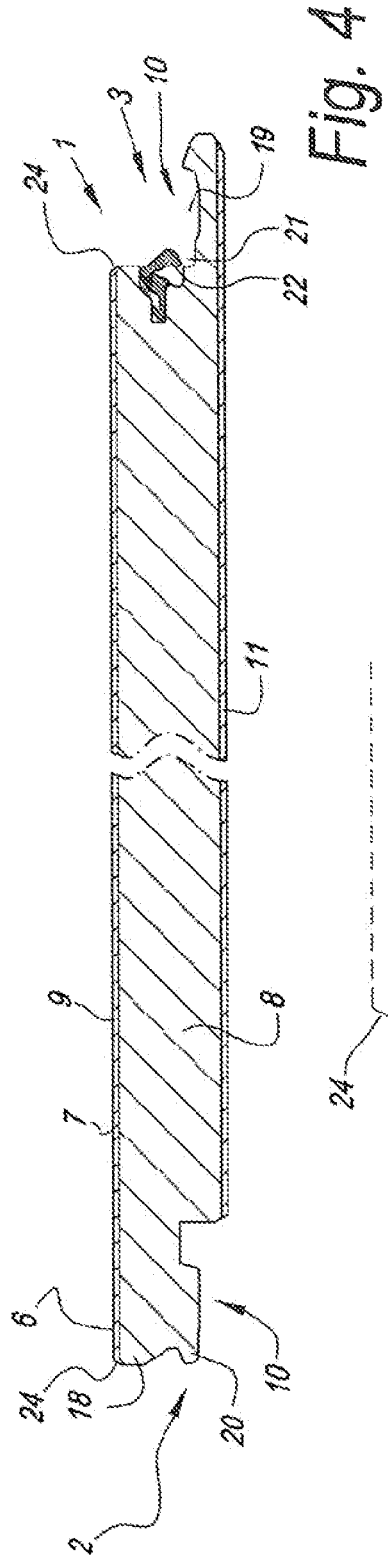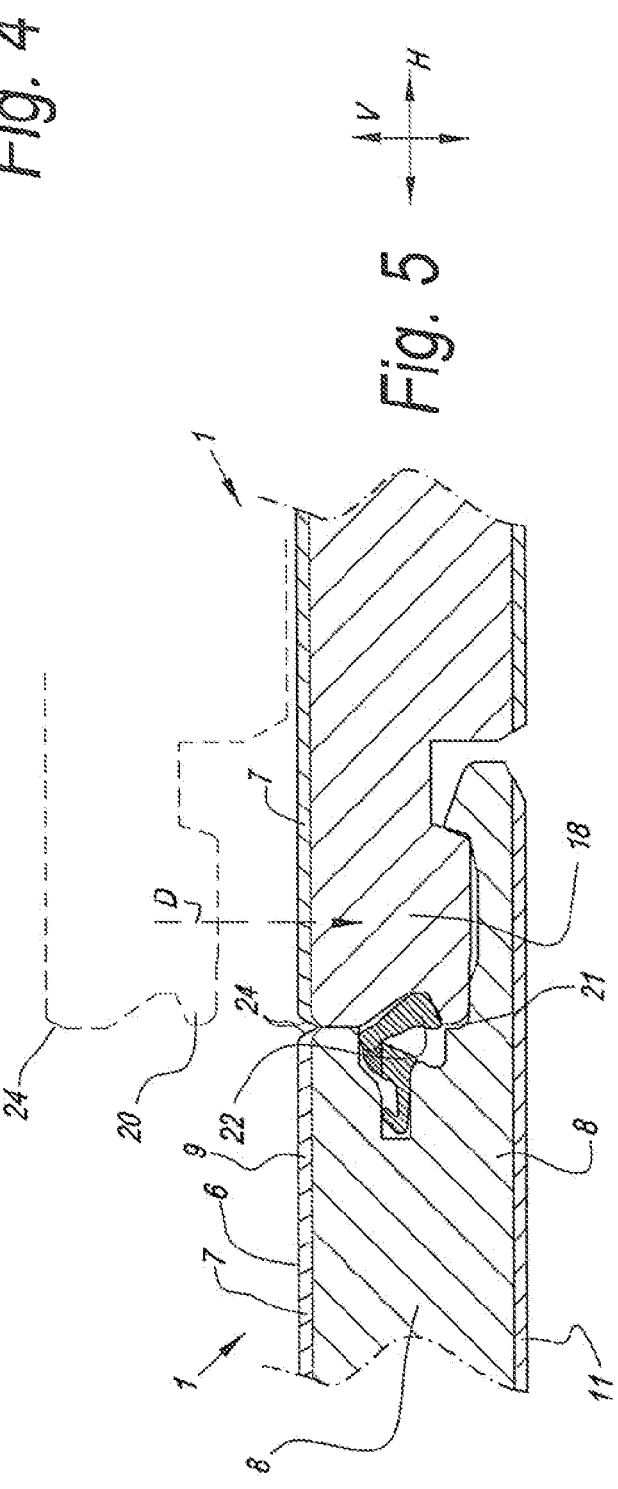

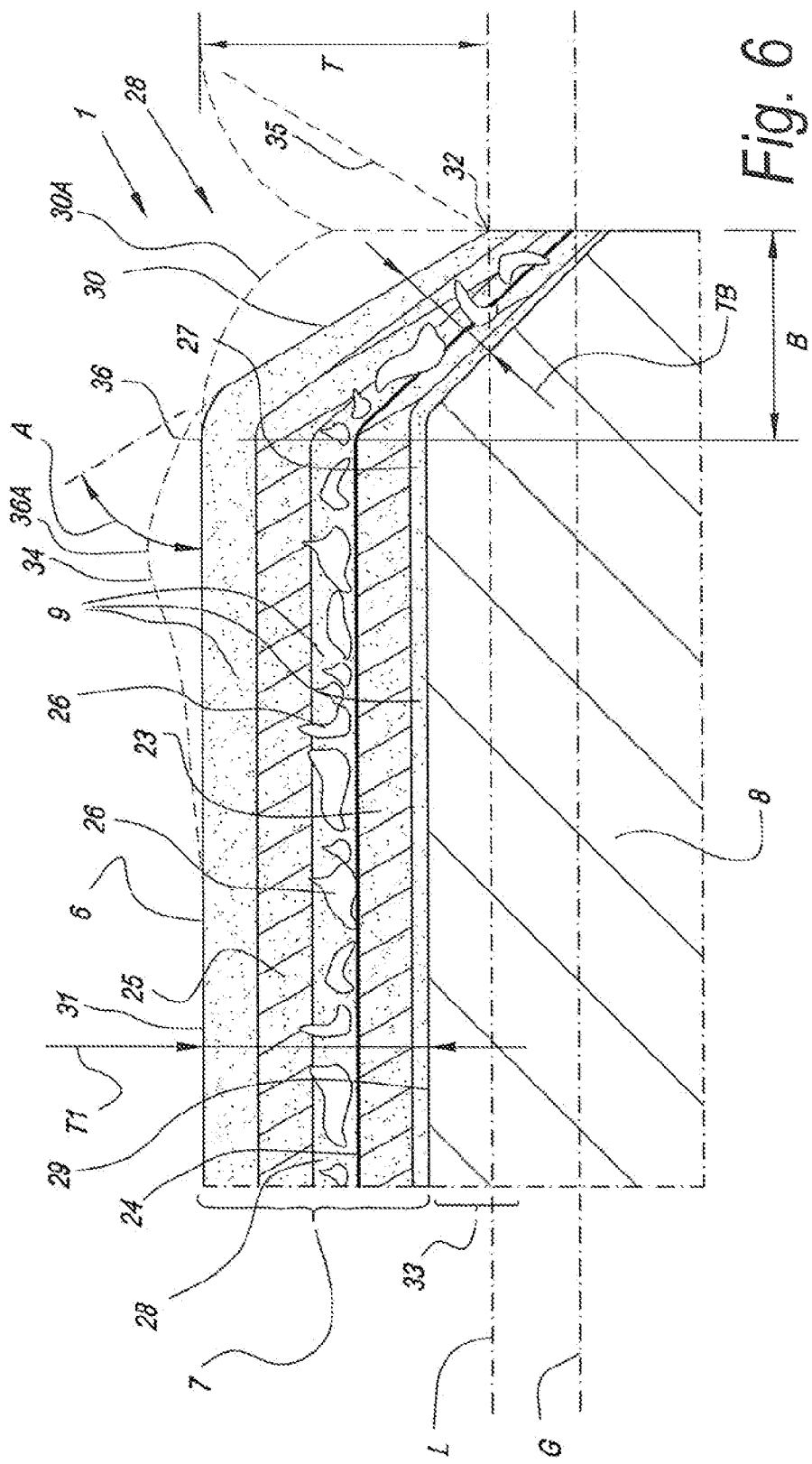

METHOD FOR MANUFACTURING A LAMINATE, AN AMINOPLAST RESIN CATALYST USED THEREIN, AND A LAMINATE OBTAINED THEREBY

BACKGROUND

This invention relates to a method for manufacturing a laminate, an aminoplast resin catalyst used therein, and a laminate obtained thereby.

The laminate obtained through the method of the present invention may have various build-ups, but at least comprises a carrier material and a cured thermosetting resin. Such laminates are widely known per se, and may be formed as a CPL (Compact or Continuously pressed Laminate), HPL (High Pressure Laminate) or DPL (Direct Pressure Laminate). In the case of CPL and HPL several resin containing carrier materials, such as paper layers, are consolidated under the application of pressure and heat. In the case of a DPL, at least one resin containing carrier material, such as a paper layer, is consolidated with a board material, such as a wood chipboard or fiberboard (MDF or HDF, ie. Medium or High Density Fiberboard).

Primarily, the invention relates to floor panels with a substrate formed from a board material and a top layer of laminate, preferably in the form of a DPL. Such floor panels are well-known as such, for example, from WO 97/47834. Herein, this may relate, for example, to floor panels with a substrate which substantially consists of a substrate obtained from an HDF board with a laminate layer directly pressed thereon, which layer comprises one or more paper sheets soaked in melamine resin, amongst which preferably also a paper sheet with a print in, for example, a wood or stone motif, namely a so-called decor paper.

In view of the fact that a melamine surface as such may impart a monotonous and sometimes plastic-like appearance to the panels, various possibilities are known in the state of the art in order to impart a more attractive appearance to this surface.

From WO 01/96689, WO 2006/063803, WO 2006/066776 and WO 2007/054812 it is known, for example, to provide the melamine surface with a wood structure which corresponds to the underlying wood motif print. Such structure interrupts the monotonous appearance of the panels.

From WO 01/96688, it is known to remove a material part from the edges of the floor panels in order to form an inclined portion. Herein, the surface of the inclined portion runs into the underlying HDF board and is provided with a separate decorative covering. Such inclined portions can realize a plank effect in the floor, wherein the adjacently installed panels will be more pronounced in the floor covering. However, the inclined portions of WO'688 are sensitive to water penetration via the inclined surface. Moreover, the separate covering of the inclined portions can show color differences in respect to the print of the laminate surface. By means of a digitally performed print at the inclined surface, WO 2007/054812 tries to offer a solution to this, but may suffer from metamerism in between the top surface and inclined surface. WO 2006/063803 also represents lower edge regions in the form of a rectangular recess with horizontal bottom as an alternative for inclined portions.

From WO 2006/066776, it is known to provide lowered edge regions by means of embossments in the laminate surface, which continue into the substrate. The edge regions represented here extend from the laminate surface towards the edge. When the laminate surface extends up to the edge of the floor panels, no undesired color differences are possible, and a better waterproofness of the panels can be assumed. Deforming the laminate surface and the underlying substrate material in accordance with WO'776 requires a particular control of the lamination process, high applied pressure, special tools, to with press plates, and possible adaptations of the HDF material. Moreover, pressing defects such as whitish spots or areas may originate in pressed zones that are less deep embossed or not embossed at all. It is the present inventors private insight that these defects are created by exposure to the heat of the press plate, before the required pressure for curing is applied. During closing of the press, the heavily structured press plate applied in WO'776 firstly engages with and pressurizes the deeply to be embossed areas, while the engagement of the press plate with areas to be less embossed is slightly delayed due to the structure of the press plate. These latter areas are however already exposed to the heat of the press plate, e.g. by radiation heat transfer from the hot press plate surface. At such areas, due to the transferred heat, the thermosetting resin starts to cure without being pressurized, and air and water bubbles get trapped in the cured resin, thereby disturbing the transparency of the resin and forming said whitish spots or areas. Further, the inventors have also found that the scratch and/or wear resistance at the laminate surface at the location of the lowered edge regions may be smaller than at the actual surface of the panel.

As is known from e.g. EP 1 225 278, a catalyst may be used in a resin mixture for paper impregnation in order to adjust curing conditions of the melamine resin. Catalysts in the field of laminate production include acids like PTSA (p-toluene sulfonic acid), as disclosed by EP'278. The presence of such catalyst is desirable for tuning the curing speed to acceptable economic levels. The inventors have however noted that such catalysts tend to worsen the occurrence of whitish spots while pressing with heavily structured press plates.

Further, for example from U.S. Pat. No. 3,888,728 it is known to use DEG (diethylene glycol) in the resin mixture to improve the flow properties of the resin, and to delay the curing to some extent. So doing, the use of DEG in the resin mixture can limit the risk of the creation of pressing defects. However, the availability of DEG in the finally cured melamine surface leads to undesirable hydrolysis effects when such melamine surface is exposed to moisture.

SUMMARY

The present invention primarily aims at offering an alternative method of manufacturing a laminate, wherein a solution is offered to one or more of the problems with the state of the art methods and/or obtained laminates.

To this aim, the invention, according to a first independent aspect, relates to a method for manufacturing a laminate, comprising at least a carrier material and a cured thermosetting resin, wherein said method at least comprises the step of providing a carrier material;
the step of providing a resin mixture, at least comprising said thermosetting resin and a catalyst for curing said resin;
the step of assembling a stack at least comprising said carrier material and said resin mixture;
the step of curing said resin under the application of heat and pressure, with as a characteristic that said catalyst shows one or a combination of two or more of the following properties:
said catalyst comprises a pressure activatable catalyst;

said catalyst comprises an encapsulated catalyst;
said catalyst comprises an organic carboxylic acid, preferably heptanoic acid.

When a catalyst comprising, or essentially consisting of, a pressure activatable catalyst is used, the curing of the resin mixture can be partially, largely or wholly delayed until pressure is applied at the respective area. So doing, the risk that pressing defects will occur is minimized.

When a catalyst comprising, or essentially consisting of, an encapsulated catalyst is used, the shell of the capsule may keep the catalyst from prematurely activating the polycondensation reaction of the resin mixture. For example because the shell somewhat delays the release of the catalyst, originally contained in the core of the capsule, into the resin mixture. The release may for example be delayed until the shell disintegrates due to heat and/or pressure.

When a catalyst comprising, or essentially consisting of, an organic carboxylic acid is used, a weaker catalyst is available than in the case of the state of the art, and premature curing of the resin at certain areas may be obviated to some extent. The carboxylic acid may be chosen from the list consisting of pentanoic acid, hexanoic acid, heptanoic acid and octanoic acid, or mixture of two or more of these carboxylic acid. Preferably, the carboxylic acid mainly or essentially comprises heptanoic acid. The inventors have found that heptanoic acid provides the best trade-off between reaction speed and solubility of the catalyst into the thermosetting resin mixture.

Preferably, at least two of the above properties are combined. For example, the encapsulated catalyst is a carboxylic acid, preferably heptanoic acid and/or the pressure activatable catalyst is an encapsulated catalyst that is released upon exerting pressure. For example, the shell of the capsules may collapse when a certain pressure threshold is reached, e.g. at a pressure of 2 bar or above and at the normal heating temperature of the press operation, for example at 180-220° C.

According to a particularly preferred embodiment, said catalyst is the main catalyst in said resin mixture and essentially comprises heptanoic acid, or another carboxylic acid, in encapsulated form, wherein the capsules have an average diameter as expressed with the d50 particle size as determined by the laser light scattering granulometry technique (ISO EN 13320:2009), of below 40 µm, and, preferably with a d90 particle size of 60 µm or below. The inventors have noted that this particle size distribution is beneficial in limiting any opacifying effects of the encapsulated catalyst. Whether or not in combination with the preferred particle size distribution, said catalyst may be the main catalyst in said resin mixture and essentially comprises heptanoic acid, or another carboxylic acid, in encapsulated form, wherein the capsules have a core shell ratio between 20-80 and 80-20, preferably 50-50 to 80-20, and/or wherein the shell preferably comprises or consists of melamine, preferably semi-cured melamine. The above mentioned core shell ratio is preferred for enabling release of the catalyst at the most common desired levels of pressure and/or temperature, and/or for limiting any opacifying effects due to the shells to an acceptable level. In the embodiments where the shell comprises or consists of melamine or semi-cured melamine, any opacifying effect may be further limited, especially in the case when the thermosetting resin mixture comprises, or essentially comprises, melamine based resin besides said catalyst. In such case, the shells hardly alter the transparency of the melamine based resin.

Preferably, said carrier material is a paper layer, wherein the method of the invention preferably comprises the step of impregnating said paper layer with said resin mixture having the catalyst with one or more of the properties of the invention. Said paper layer, before impregnation, preferably has a porosity or air resistance as expressed by Gurley value (TAPPI T-460) of 25 seconds or below, in order to allow for a sufficient resin take-up. Preferably, said carrier material is a pure, e.g. alpha-cellulose based, paper, preferably of the so-called overlay type. The ash content of said paper, before impregnation, is preferably lower than 20 gr/m$^2$, and even better lower than 5 or lower than 1 gr/m$^2$, or even about 0 gr/m$^2$. In the case where the ash content of the paper is between 5 and 20 gr/m$^2$, this ash content is preferably entirely made up by aluminum oxide or so-called corundum, which e.g. has been added during the production of the paper in order to yield an overlay of the type disclosed in DE 2 107 091. Said carrier material may have a raw paper weight of 15 to 35 gram per square meter, and may become impregnated with a solid content of resin which is at least 100% of the raw paper weight, during said step of impregnating the paper layer. In the case where the ash content of the unimpregnated paper is between 5 and 20 gr/m$^2$, the raw weight of the paper may accordingly be between 20 and 55 gr/m$^2$. In connection to the impregnation, the paper may be provided with aluminum oxide particles at one or both surfaces. These aluminum oxide particles may be available at a rate of 5 to 20 grams per square meter especially in the cases where the ash content of the paper is free from such particles or does not already comprise such amount of particles. The aluminum oxide particles preferably have an average particle size as expressed with the d50 value as determined by the laser light scattering granulometry technique (ISO EN 13320:2009) of between 20 and 200 micron.

The properties mentioned above, that are linked to limiting opacity and/or maintaining transparency are especially important when said resin mixture is applied above a decoration, such as a printed decorative pattern, of the laminate, e.g. in order to protect such decoration from abrasion and wear. Such can for example be the case for laminates where the resin mixture is applied to a so-called overlay, available above a decor paper, e.g. produced in a DPL process.

It is further remarked that, in the case of the presence of an encapsulated and/or pressure activatable catalyst in a resin mixture, the content of flow promotors, like DEG (diethylene glycol), in the resin mixture may be reduced to a large extent or may be omitted entirely. Indeed, the resin viscosity only quickly rises, and its flow properties lower, when the catalyst is activated or released from the capsules. In other words, the resin mixture having the encapsulated and/or pressure activatable catalyst, is flowing during a longer period of time than is the case with resins having the catalysts from the state of the art. Such long flow enables the mitigation of the risk of pressing defects, and a good copying of small structure details from the press plate structure, such as structures leading to gloss or matt effects. The present invention does allow to work without DEG in the resin mixture, and as such largely reduce any hydrolysis effects. Thus, the resin mixture having the catalyst with the inventive properties is preferably free from DEG (diethylene glycol) and/or other flow promotors, or comprises an amount of DEG and/or other flow promotors less than 1 wt % solid content in the resin mixture.

Preferably, said laminate further comprises a board material and/or one or more further carrier materials or paper layers. Preferably this board material and/or said one or more further carrier materials are comprised in said stack.

The board material preferably has a density of 750 kg/m 3 or above, or even 1000 kg/m 3 or above. It is especially with such high density materials that pressing defects may originate, which are now, through the inventive method, to a large extent avoided. The board material may be a wood-based board material, such as an MDF or HDF board, a chipboard, or similar. According to other embodiments, the board material may be a mineral board, such as a gypsum based, a magnesium oxide based or a cement based board, preferably reinforced with a fibrous content, e.g. cellulose fibers, synthetic fibers, glass fibers, and/or one or more fibrous layers, such as one or more glass fiber webs. According to still other embodiments, the board material may be a polymer or a synthetic composite material. Preferably, such board material is a solid board material, basically or entirely free from foamed material. In both cases, the polymer may be chosen from the list consisting of polyvinylchloride, polyurethane, polyethyleneterephtalate and polyethylene. The composite material comprises besides said polymer also filling materials preferably chosen from the list consisting of $CaCO_3$, bamboo particles, wood particles, talcum, straw particles and grass particles.

The one or more further carrier layers or paper layers may include at least a decorative paper layer, preferably also provided with thermosetting resin. Preferably, in such case the decorative paper layer is provided with a resin mixture that is free from catalyst, or comprises a catalyst other than a catalyst showing one or more of the inventive properties. Preferably the catalyst used in the resin mixture that is provided on, e.g. impregnated into, the decorative paper layer is a sulphonic acid, such as the above mentioned PTSA, maleic acid, monobutyl phosphoric acid or citric acid. Preferably the catalyst applied in the resin mixture for the decorative paper is freely available in the mixture, i.e. is not encapsulated. The decorative paper layer preferably has a raw paper weight between 60 and 90 $gr/m^2$, for example about 70 $gr/m^2$, and/or a porosity or air resistance as expressed by Gurley value of 25 seconds or below. The ash content of the paper layer, i.e. without the decoration and the impregnation, is preferably between 20 and 40 percent.

The one or more further carrier layers or paper layers may comprise an underlay, i.e. a paper being present in between the possible board material and the possible decorative paper layer. Such paper layer is preferably provided with thermosetting resin. The presence of such paper may further limit the presence of pressing defects, as some of the embossment from a heavily structured press plate may be provided in this paper layer, such that the deformation of the board material can be limited somewhat.

The one or more further carrier layers or paper layers may comprise a plurality of paper layers or cardboard layers provided with thermosetting resin and substantially making up a core material, in order to form a panel as disclosed in WO 2013/050910.

The one or more further carrier layers or paper layers may comprise a counterbalancing layer, i.e. a paper situated at the side of the laminate opposite the carrier material having the catalyst showing one or more of the inventive properties. Such paper layer may suitably have a raw paper weight of about 70 to 120 $gr/m^2$ and is provided with thermosetting resin.

As mentioned above, the carrier material provided with the resin mixture having the catalyst with the inventive properties preferably is a low ash content alpha-cellulose paper, namely having an ash content of 20% or lower, or even of 1% or lower.

Preferably said step of curing is performed at a pressure of 10 to 40 bars, or of 20 to 40 bars. The inventors have surprisingly witnessed that it is possible to use heavily structured press plates and/or to create embossments having a depth of 0.4 mm or more, e.g. 0.5 to 1 mm deep, or 0.6 to 1 mm deep, even in this low pressure range without having pressing defects. Pressing equipment operating in this pressure range is readily available in the flooring and laminate industry. The present invention enhances the versatility of such standard presses, because it has now become possible to use heavily structured press elements also on such presses, which in itself may lead to the manufacturing of laminates with enhanced properties, while at the same time being more attractive to the consumer. The enhanced properties may, in the case of a DPL floor panel, for example comprise the availability of a beveled edge at one or more edges of the panels, wherein the top laminate layer continues in one piece from the upper surface over the beveled edge to the actual edge of the panel. Such bevel is, from the point of view of water resistance and attractiveness, more desirable than a bevel created by machining away said top laminate layer at the edge, as e.g. disclosed in WO 01/96688.

Preferably, said step of curing is performed at a temperature of 120° C. to 220° C., and even better at a temperature of 180° C. to 220° C. This temperature range enables an economically acceptable pressing time in said step of curing the resin, for example of between 12 and 32 seconds, or even between 12 or 15 and 25 seconds.

From the above it is clear that said step of curing is preferably performed in a press that is provided with a structured mould, more particularly with a structure press plate or press belt. Preferably said mould is configured to create at least one or a plurality of embossments in the laminate having a depth of 0.4 mm or more, preferably 0.6 mm or more. Preferably, such embossments at least comprise embossments that form lowered edges, e.g. beveled edges, at one or more opposite sides of the final laminates, e.g. DPL floor panels.

It is clear that said structured mould preferably comprises protrusions having a height larger than 0.4 mm, preferably larger than 0.6 mm.

According to the most preferred embodiment of the method of the invention in accordance with its first aspect, said method shows the following additional features: said carrier material is a paper layer having a dry paper weight of 15 to 35 grams per square meter; said resin mixture is provided by impregnating said carrier material; said resin mixture comprising encapsulated hexanoic, heptanoic or octanoic acid as a catalyst at a rate between 2 and 20 grams per square meter; wherein said capsules have a core shell ratio between 50-50 to 80-20, and wherein the shell comprises or consists of melamine, preferably semi-cured melamine; said capsules having an average diameter as expressed with the d50 particle size as determined by the laser light scattering granulometry technique (ISO EN 13320:2009), of below 20 or below 25 µm, and, preferably with a d90 particle size of 40 µm or below; said stack comprises at least a board material, such as an MDF/HDF board, a decorative paper layer possibly impregnated with thermosetting resin; and said carrier material impregnated with said resin mixture; said step of curing is carried out in a short cycle press containing a structured press element, at a pressure of 20 bar or above, at a temperature of 185° C. or above, preferably during 20 seconds or below. As afore stated said structured press element preferably comprises protrusions of 0.4 mm or higher.

It is clear that the above most preferred embodiment is an example of a DPL process, where e.g. the overlay has been impregnated with a resin mixture comprising the catalyst with the inventive properties. Preferably, as mentioned above, the decorative paper layer is impregnated with a thermosetting resin mixture comprising free catalyst. Preferably said stack further comprises a resin impregnated paper layer for forming a counterbalancing layer, as discussed above.

With the same goal as in the first aspect of the invention, the invention in accordance with a second independent aspect is a method for impregnating a paper, with as a characteristic that said paper is impregnated with a resin mixture at least comprising an aminoplast resin and a catalyst, wherein said catalyst is the main catalyst in said resin mixture and essentially comprises heptanoic acid, or another carboxylic acid, in encapsulated form, wherein the capsules preferably have an average diameter as expressed with the d50 particle size as determined by the laser light scattering granulometry technique (ISO EN 13320:2009), of below 25 µm, and, preferably with a d90 particle size of 40 µm or below. It is clear that the obtained paper may be applied as the carrier material mentioned in the first aspect, and/or that the catalyst and/or resin may show further characteristics identical to those mentioned in the first independent aspect for overlay papers, decorative papers, e.g. used in a DPL process.

With the same goal as in the first and second independent aspect, the present invention in accordance with a third independent aspect is an aminoplast resin catalyst for use in a method having the characteristics of the first and/or second aspect and/or the preferred embodiments thereof, with as a characteristic that said catalyst comprises an encapsulated acid, preferably encapsulated in an aminoplast shell. Preferably said aminoplast resin is a melamine-based resin and/or said shell comprises or consists of melamine, preferably semi-cured melamine It is clear that the present invention also concerns a laminate obtained by means of a method in accordance with the first independent aspect and possibly its preferred embodiments, a paper obtained by means of a method in accordance with the second independent aspect and possibly its preferred embodiments, a laminate obtained by the use of a paper in accordance with the second independent aspect and/or by the use of an aminoplast resin catalyst in accordance with the third independent aspect, and possibly their respective preferred embodiments.

Preferably, a laminate obtained through the present invention in accordance with any of its aspects comprises a substrate and a top layer, wherein said floor panel, at one or more edges, is provided with a lower edge region in the form of a bevel or other chamfer, with the further characteristic that said top layer extends in one piece from the actual upper surface of the substrate over the lower edge region at least up to a point wherein the laminate surface is at a level in a horizontal plane which intersects said substrate, and that the substrate material, at the location of the lower edge region, has a higher density than at the actual upper surface of the substrate material. By means of the continuous laminate surface, an excellent color consistency between the lower edge region and the laminate at the actual upper surface can be obtained, and a water-tight layer is obtained at the lower edge region. As the lower edge region is made relatively deep, a possible deficient adjoining between adjacent floor panels in a floor covering is less irritating.

Preferably, the aforementioned level is located at a depth of at least half a millimeter, and preferably a depth of less than one and a half millimeters, underneath the upper side, or the highest point, of the top surface.

Preferably, the level of the top surface continuously declines from the actual upper surface to the lower edge region. By this is meant that there are no intermediate regions where the top surface ascends. Excluding such regions in the proximity of the lowered edge region is of particular importance for the prevention of premature wear.

Preferably, the aforementioned lower edge region is realized with a sloped surface, for example, as an inclined portion which, globally seen, includes an angle with the actual upper surface of more than 30°, for example, of 35° to 60°, and preferably approximately 45°. Preferably, the opposite edge of the floor panel is also provided with such lower edge region, such that when adjoining to a similar panel, a V-groove is formed in the floor covering. Preferably, the sloped surface of the lower edge region extends up to the actual edge of the floor panel.

Of course, other types of lower edge regions are not excluded. So, for example, the lower edge region, in conjunction with an opposite edge region of a similar floor panel, can result in a rather rectangular recess or U-shaped groove in the floor covering, namely a groove with an approximately horizontal bottom. Herein, it is possible that each of the opposite edges forms a portion of the approximately horizontal bottom, or that one of the opposite edges forms the entire bottom, whereas the other edge is not provided with a lower edge region.

The lowered edge region may or may not be realized with a geometry varying along the edge concerned. According to a particular embodiment of such lowered edge region, at least the width thereof varies along the edge concerned. Such variation in width can take place over a substantial portion of the length of the edge concerned or can be rather local. The present invention allows such varying edge region in an excellent manner.

According to another particular embodiment, the laminate surface, at the location of the lowered edge region, also has a surface structure, for example, a wood structure or stone structure, as a function of the motif in the laminate. In the case of a wood structure, for example, a structure of wood pores can be applied, whether or not conform to the underlying wood print.

Preferably, the substrate substantially consists of an HDF board material having an average density of more than 800 kilograms per cubic meter. Preferably, this concerns an HDF board having at its both surfaces a locally higher density, so-called peak density, which is at least 110% of the average density. It is clear that in such case the HDF material situated more centrally seen in the thickness dimension has a density which is lower than the average density and, for example, has less than 90% of this average density. Preferably, said substrate at the actual substrate surface has a density of more than 900 kilograms per cubic meter.

As aforementioned, the floor panel, on at least two opposite edges, preferably comprises such lower edge regions. Herein, the respective point up to which the top surface extends is located in both lower edge regions preferably on an equal horizontal level or practically equal horizontal level, wherein a possible difference in horizontal level is less than the thickness of the top layer. Hereby it is achieved that the substrate material cannot become visible at the location of two adjoining floor panels.

As aforementioned, for the thermally hardening or thermosetting resin of the decor paper preferably a resin on the basis of melamine will be chosen, for example, melamine formaldehyde. Of course, the resin may comprise one or more additives, besides the already mentioned catalyst for the decorative paper. A particularly useful additive is a fraction of an acrylic resin, a polyol, such as butane diol or polyurethane diol, a polyolacrylate or another hydroxyfunctional acrylate. Such resin can be at least partially crosslinked or hardened, whereas still a sufficient processability of the decor paper is maintained. Working with hydroxyfunctional acrylate, or in other words an acrylate comprising a OH group, has the advantage that OH groups can be brought into the melamine in that the acrylate is soluble in melamine.

Preferably, in said step of curing under the application of heat and pressure, apart from possibly realizing the lower edge regions, preferably also a relief or surface structure is realized at least on the actual surface of the laminate panels. Preferably, the applied pressing pressure is less than 60 bar (6 MPa), or even less than 40 bar (4 MPa). The applied pressing temperature preferably is larger than 100° C. and may amount to 200° C. By means of the above pressing parameters, a pressing time situated between 12 and 32 seconds may suffice; preferably, use can be made of a pressing time situated between 15 and 25 seconds.

Independent of the presence of a relief or surface structure at the actual surface of the laminate, it is possible that during said step of curing under pressure a relief or surface structure is realized in the surface at the location of said lowered edge regions, for example, for obtaining a geometry of the edge region concerned which varies somewhat along the edge.

According to all aspects, the step of curing under pressure preferably concerns a press treatment by means of an opening and closing press, namely, a so-called Kurztaktpresse or Single-Daylight press. Herein, preferably a press element is applied in the form of a structured press plate. During said press treatment, the structure of the press plate is copied in the surface of the laminate panels. For examples of possible press plates, reference is made to the already above-mentioned WO 2006/066776.

It is clear that within the scope of the present invention, by thermally hardening or thermosetting is meant that the respective material hardens irreversibly with heat supply, this contrary to thermoplastic materials, which allow melting. Preferably, for the thermally hardening material, a material is applied which hardens by polycondensation. Instead of melamine-based resin, for the polycondensating material also urea or melamine-urea-based resin can be applied, such as urea formaldehyde or melamine urea formaldehyde.

Preferably, according to all aspects of the invention, finally in the top layer of the panel an amount of thermally hardening material is applied which preferably is situated between 30 and 200 grams per square meter, and still better is situated between 50 and 150 grams per square meter of dry weight. For a possible counterbalancing layer, the same limits may be applied, which does not necessarily have to lead to an amount of resin which is equally large. Preferably, the amount of resin in the balancing layer deviates at most 20 percent from the amount of resin in the top layer.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 4, in a view similar to that of FIG. 2, represents a variant;

FIG. 5, at a larger scale, represents the floor panel of FIG. 4 in coupled condition;

FIG. 6, at a larger scale, represents a view of the area indicated by F6 in FIG. 2.

DETAILED DESCRIPTION OF VARIOUS EMBODIMENTS

Figure 1:
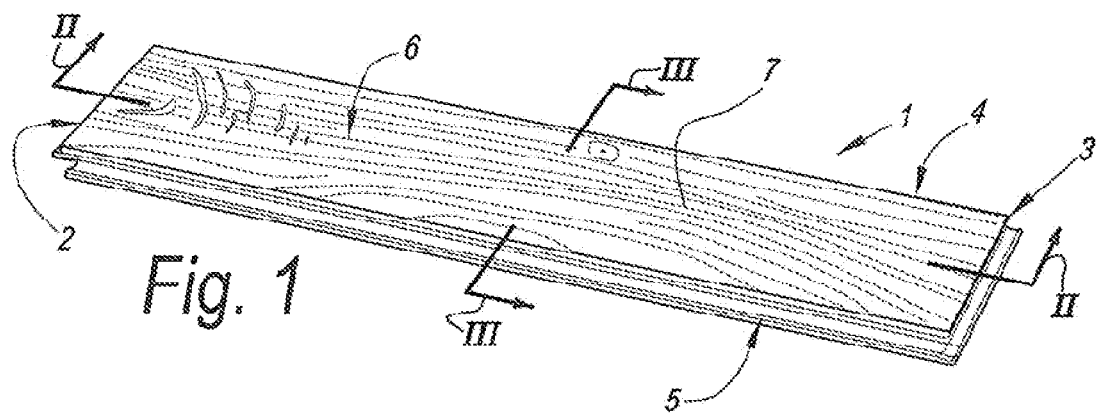
FIG. 1 in perspective represents a floor panel obtained through the method of the invention.

FIG. 1 represents a decorative panel, more particularly a floor panel 1, obtained through a method in accordance with the invention. The panel 1 is rectangular and oblong and comprises a pair of opposite short edges 2-3 and a pair of opposite long edges 4-5. The decorative top layer 6 is formed by a separate layered portion 7.

Figure 2:
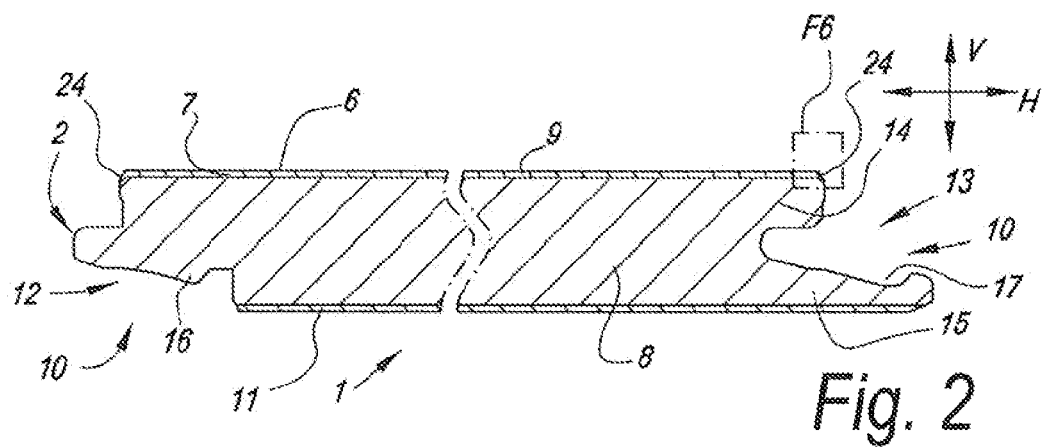
FIGS. 2 and 3, at a larger scale, represent a cross-section according to the lines II-II and III-III, respectively, represented in FIG. 1.

FIG. 2 clearly shows that the decorative panel 1 comprises a substrate 8 on which the layered portion 7 is provided, in this case by means of a DPL technique without additional resin or glue layers. To this aim, the layered portion 7 comprises a thermosetting resin, namely, melamine resin 9. In the example, the substrate material 8 has an average density of more than 800 kilograms per cubic meter. In this case, this concerns an HDF board material having an average density of 900 kilograms per square meter and a surface density or peak density of more than 1000 kilograms per square meter. At the edges 2-3 and 4-5, mechanical coupling means 10 are formed in the substrate material by means of milling. At the lower side of the substrate material 8, a backing layer 11 is provided by means of the same DPL technique.

Figure 3:
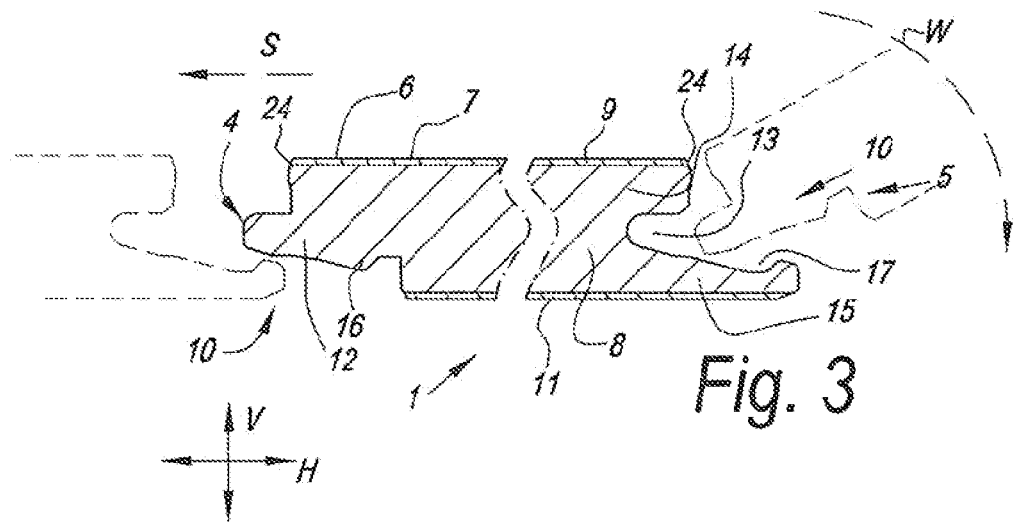

FIGS. 2 and 3 represent that both pairs of opposite edges 2-3-4-5 are provided with mechanical coupling means 10, which substantially are realized as a tongue 12 and a groove 13 bordered by an upper lip 14 and a lower lip 15, wherein the tongue 12 and the groove 12 substantially are responsible for the locking in a vertical direction V, and wherein the tongue 12 and the groove 13 are provided with additional locking parts 16-17, which substantially are responsible for the locking in a horizontal direction H. Preferably, the locking parts comprise a protrusion 16 at the lower side of the tongue 12 and a recess 17 in the lower groove lip 15. The coupling means 10 represented in FIGS. 2 and 3 allow at least a coupling by means of a rotational movement W around the respective edges 2-3-4-5 and/or a coupling by means of a shifting movement S, in a substantially horizontal manner, of the edges 2-3-4-5 to be coupled towards each other.

FIGS. 4 and 5 represent a variant with a pair of short edges 2-3, which allow obtaining a coupling at least by means of a downward movement D. One edge 2 is provided with a male coupling part 18, whereas the other edge 3 is provided with a female coupling part 19. By means of the downward movement D, the male coupling part 18 is pressed into the female coupling part 19 in order to be locked there in the vertical direction V, as a result of a pair of protrusions 20 and recesses 21 working in conjunction. In this case, the recess 21 partially is formed by a resilient element 22 present in the female coupling part 19.

FIG. 6 represents a detail of the upper edge of the floor panel from FIG. 2 and clearly shows that the layered portion 7 is formed of a paper sheet soaked in and/or impregnated with resin 9, with a print 24, namely, a so-called decor paper 23, and a situated thereon transparent or translucent paper sheet soaked in resin 9, namely, a so-called overlay 25. The layered portion 7 further also comprises wear-resistant particles 26, in this case corundum particles or $Al_2O_3$ particles, at a position where they are situated substantially above the print 24. The hard particles 26 concerned preferably are applied by means of the overlay 25, more particularly by means of the resin 9 situated at the lower side of the overlay 25.

It is noted that for clearness' sake, the mutual thicknesses of the paper sheets and intermediate resin layers are represented only schematically. So, for example, the resin layer 27 between the lower side of the decor paper 23 and the substrate 8 in practice shall be hardly visible, and the decor paper does contact or almost contact the substrate 8. Here, in the example this namely concerns a resin layer 27 which is provided by means of the decor paper 23 and provides for the connection to the substrate 8. During the press treatment forming the DPL, this resin substantially penetrates into the substrate material 8. Concerning the resin layer 28 between the overlay 25 and the decor paper 23, it is noted that this layer partially is provided via the overlay 25 and partially via the decor paper 23.

According to the most preferred embodiment of the present invention, the resin mixture contained in or on the overlay 25 comprises a catalyst on the basis of encapsulated heptanoic acid. Such is not visible on the respective figures.

Further, the floor panel of FIGS. 1 to 6, at one or more edges 2-3-4-5, is provided with a lower edge region 28, wherein the layered portion 7 extends in one piece from the actual upper surface 29 of the substrate 8 over this lower edge region 28. In the example, the lower edge regions 28 are realized as a bevel or inclined portion 30, which in this case encloses an angle A of approximately 60° with the upper surface 31. Dashed line 30A illustrates an alternative geometry of such lower edge region 28 that is somewhat curved. The layered portion 7 extends over the lower edge region 28 at least to a point 32 wherein the laminate surface is situated at a level L in a horizontal plane which intersects the aforementioned substrate 8. At the location of the lower edge regions 28, the layered portion 7 on average may have a thickness TB which is smaller than the global thickness T1 of the layered portion 7. This difference in thickness then is obtained in that the layered portion 7 is more compressed or impressed at these edges, however, this does not necessarily have to be so. The layered portion 7 at the edge region 28 may have also approximately the same thickness TB as the layered portion 7 at the actual upper surface 29. Preferably, the average thickness TB of the layered portion 7 at the lower edge regions is between 85% and 115% of the global thickness T1 of the layered portion 7 at the actual upper surface 29 of the substrate 8.

At the location of the lowered edge region 28, the substrate material 8 may be heavily compressed.

FIG. 6 further represents that the layered portion 7, without additional resin layers or glue layers, is directly attached to the substrate 8, namely, to the actual upper surface 29 as well as at the location of the lower edge region 28. The aforementioned hard particles 26 are present at the location of the actual upper surface 29, as well as at the location of the lower edge region 28, and in this case even in approximately the same concentration.

The level of the laminate surface 31 continuously diminishes from the actual upper surface 29 of the substrate 8 up to the lower edge region 28 and, in this case, even up the aforementioned point 32 at the edge of the floor panel 1. In dashed line 34, a less desirable situation is represented wherein this is not the case and wherein next to the lower edge region 28 an elevation is present, which then continues towards the laminate surface 31. Such elevation may arise e.g. when the depth T of the lower edge region is larger than 0.5 mm. In such case the material of the substrate 8 must in some cases be displaced from the lower edge region 28 and tends to accumulate next to the lower edge portion 28 where the elevation has been illustrated with the dashed line 34. Such elevation may be avoided by preforming the upper surface 29 of the substrate 8 as disclosed in WO 2017/072657.

FIG. 6 further also shows, by dashed line 35, that the floor panels from FIGS. 1 to 6 shows such lower edge regions 28 on at least two opposite edges, wherein the respective point 32, up to where the laminate surface 31 is extending, in both lower edge regions 28 is preferably situated at an equal horizontal level L. Adjoining both inclined portions or lower edge regions 28 here results in a so-called V-groove in the floor surface.

The depth T over width B ratio of the lower edge region 28 is preferably between 35 and 150 percent, and even better between 50 and 100 percent, and in this case the ratio created by the inclined portion 30 is approximately 137 percent. In the case of the alternative indicated with the dashed line 30A, the ratio is about 65 percent. Herein, the width B is determined starting from the point 36-36A, where the laminate surface 31 starts lowering, onto the edge of the lowered edge region 28, namely, in case of the inclined portion 30, to the point 32. The ratio between 80 and 150 percent is preferably obtained by a method wherein the upper surface of the board 8 has been preformed, e.g. in accordance with WO 2017/072657.

Figure 7:
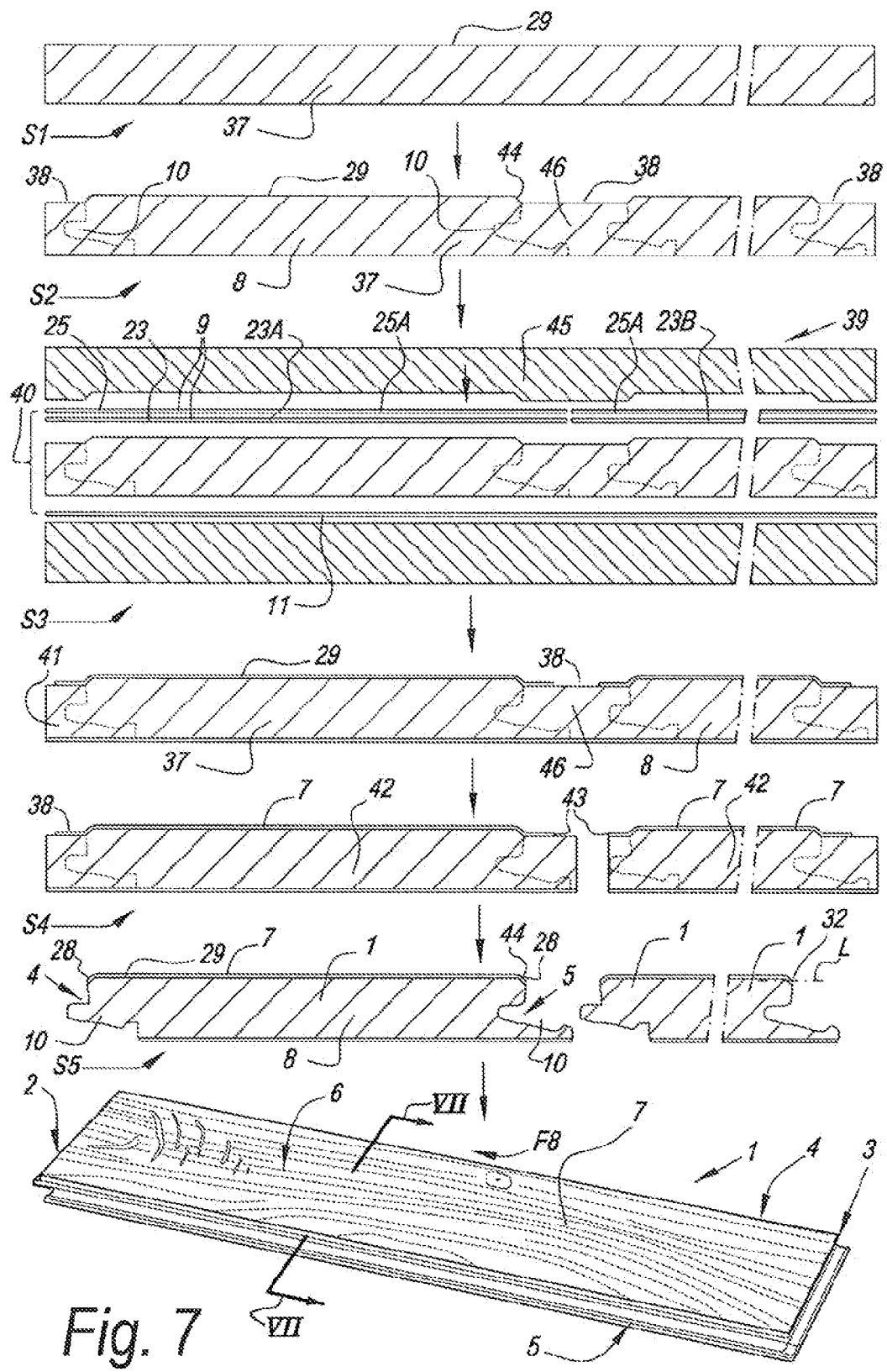
FIG. 7 schematically represents some steps in a method according to the first aspect of the invention.

FIG. 7 schematically represents some steps in a method for manufacturing a laminate, more particularly laminate floor panels 1 having a lowered edge region 28. Herein, this relates to a method comprising at least the following steps:

the step S1 of providing a basic board material 37 for the material of the substrate 8;

the optional step S2 of structuring the upper surface 29 of said basic board material 37, wherein this structure consists at least of a recess 38 in the surface 29 of the basic board material 37 at the location of said lower edge region 28.

the step S3 of assembling or composing a stack 40 which comprises at least the basic board material 37 and one or more carrier layers, such as paper layers, and a resin mixture. In this case, the stack 40 at the top comprises two paper sheets soaked in melamine resin, namely, a decor paper 23 and an overlay 25. At the bottom, the stack 40 also comprises a paper sheet soaked in resin, which finally has to serve as the balancing layer 11. In accordance with the present invention, at least one of the paper layers is provided with and/or impregnated with a resin mixture comprising a catalyst having one or more of the inventive properties of the invention. Preferably said catalyst is an encapsulated carboxylic acid, e.g. heptanoic acid. In the example, both the decor paper 23 and the overlay 25 comprise a plurality of adjacently situated paper strips 23A-23B; 25A-25B, namely, in this case, one paper strip 23A-23B per adjacently situated final floor panel 1. However, it is not excluded that for the decor paper and/or the overlay one paper strip per two or more of adjacently situated final floor panels 1 is applied, or even just one decor and/or overlay paper strip or web for all of the floor panels being manufactured from the respective stack. The stack 40 is then pressed in a heated press device 39. During pressing, the melamine resin 9 cures or hardens, and the resin, together with the decor paper 23 and the overlay 25, forms a layered portion 7 adhered directly onto the substrate 8. This layered portion 7 extends in one piece from the actual upper surface 29 of the basic board material 37 up to into said recess 38, at least up to a point 32, wherein the laminate surface 31 is situated at a level L in a horizontal plane intersecting the basic board material 37 or the final substrate 8;

the step S4 of subdividing the pressed whole 41 into panels 42, of which said floor panels 1 can be formed. The subdividing operation takes place in the so-called technical zone 46. This is an area of the pressed whole 41 which will not form part of any of the finally obtained floor panels 1. In this case, this subdividing takes place at the location of the edges 43 of the adjacent paper strips 23A-23B.

the step S5 of finishing the aforementioned panels 42 to form said floor panels 1, wherein an edge 44 of said recess 38 forms the substrate material 8 at the location of the lower edge region 28.

It is clear that the method illustrated by means of FIG. 7 can be applied for realizing the floor panels from FIGS. 1 to 6. For clarity's sake, in FIG. 7 the shape of the final coupling means 10 is indicated in dashed line.

Further, it is clear that the view represented in FIG. 7 relates to a cross-section across the basic board material 37, namely in a direction perpendicular to the length of the final floor panels, to with in the direction VII-VII indicated below in that figure. It is possible that, seen in longitudinal direction, a plurality of floor panels are successively taken from the pressed whole 41. The paper strips 23A-23B-25A-25B possibly may be continuous over the length of two or more floor panels 1 situated one after the other in the basic board.

In FIG. 7 further a heavily structured press element, more particularly press plate 45, is shown.

It is noted that the method of the invention is not necessarily used for manufacturing laminates having deep structural features in the form of lowered edge regions such as bevels. Deep structural features, e.g. with an embossed depth of 0.25 mm or more, or even 0.5 mm or more, may also be available centrally in the top surface of such laminates, for example to create the imitation of seams, cracks, wood knots and the like. According to a variant, deep structural features may be absent altogether as well in the surface of the manufactured laminate.

It is also noted that, although the figures represent embodiments wherein both a first and a second pair of opposite edges are provided with lowered edge regions, it is also possible that only one pair of opposite edges is provided therewith. In such case this preferably concerns the long edges 4-5.

The present invention is in no way limited to the herein above-described embodiments, on the contrary may such floor panels and methods be realized without leaving the scope of the present invention.

The invention claimed is:

1. A method for manufacturing a laminate, comprising at least a carrier material and a cured aminoplast resin, wherein said method at least comprises:
the step of providing a carrier material;
the step of providing a resin mixture, at least comprising said aminoplast resin and capsules comprising a catalyst for curing said resin;
the step of assembling a stack at least comprising said carrier material and said resin mixture;
the step of curing said resin under application of heat and pressure,
wherein the capsules comprise a shell comprising melamine.

2. The method in accordance with claim 1, wherein said carrier material is a paper layer,
wherein said paper layer is impregnated with said resin mixture.

3. The method in accordance with claim 1, wherein said laminate further comprises a board material and/or one or more further carrier materials.

4. The method in accordance with claim 1, wherein said carrier material is a low ash content alpha-cellulose paper.

5. The method in accordance with claim 1, wherein said step of curing is performed at a pressure of 20 to 40 bars.

6. The method in accordance with claim 1, wherein said step of curing is performed at a temperature of 120° C. to 220° C.

7. The method in accordance with claim 1, wherein said step of curing is performed in a press that is provided with a structured mould.

8. The method in accordance with claim 7, wherein said structured mould comprises protrusions having a height larger than 0.4 mm.

9. The method in accordance with claim 1, wherein said catalyst is heptanoic acid,
wherein the capsules have a core shell ratio between 20-80 and 80-20.

10. The method in accordance with claim 1, wherein said catalyst is heptanoic acid,
wherein the capsules have an average diameter as expressed with a d50 particle size as determined by a laser light scattering granulometry technique (ISO EN 13320:2009), of below 40 μm.

11. The method in accordance with claim 1, wherein
said carrier material is a paper layer having a dry paper weight of 15 to 35 grams per square meter;
said resin mixture is provided by impregnating said carrier material;
said catalyst being hexanoic, heptanoic or octanoic acid and being present at a rate between 2 and 20 grams per square meter;
wherein said capsules have a core shell ratio between 50-50 to 80-20;
wherein said capsules having an average diameter as expressed with a d50 particle size as determined by a laser light scattering granulometry technique (ISO EN 13320:2009), of below 25 μm;
wherein said stack comprises at least a board material, a decorative paper layer possibly impregnated with thermosetting resin; and said carrier material impregnated with said resin mixture;
said step of curing is carried out in a short cycle press containing a structured press element, at a pressure of 20 bar or above, at a temperature of 185° C. or above.

12. A method for impregnating a paper, wherein said paper is impregnated with a resin mixture at least comprising an aminoplast resin and capsules comprising a catalyst,
wherein said catalyst is heptanoic acid,
wherein the capsules have an average diameter as expressed with a d50 particle size as determined by a laser light scattering granulometry technique (ISO EN 13320:2009), of below 25 μm;
wherein said capsules are pressure-activatable and release said catalyst upon exerting pressure.

13. A laminate obtained by the method of claim 1.

14. The method in accordance with claim 1, wherein the catalyst is a pressure activatable catalyst.

\* \* \* \* \*